United States Patent
Litmanovic et al.

(10) Patent No.: US 11,309,679 B2
(45) Date of Patent: Apr. 19, 2022

(54) EXTERNAL OPTICAL FEEDBACK ELEMENT FOR TUNING A MULTI-WAVELENGTH GAS LASER

(71) Applicant: Novanta Corporation, Mukilteo, WA (US)

(72) Inventors: Jacob Litmanovic, Mukilteo, WA (US); Jason Bethel, Seattle, WA (US); Ross Wheeler, Mukilteo, WA (US); Patrick Kolsch, Mukilteo, WA (US)

(73) Assignee: Novanta Corporation, Mukilteo, WA (US)

( * ) Notice: Subject to any disclaimer, the term of this patent is extended or adjusted under 35 U.S.C. 154(b) by 14 days.

(21) Appl. No.: 16/612,601

(22) PCT Filed: May 9, 2018

(86) PCT No.: PCT/US2018/031758
§ 371 (c)(1),
(2) Date: Nov. 11, 2019

(87) PCT Pub. No.: WO2018/208887
PCT Pub. Date: Nov. 15, 2018

(65) Prior Publication Data
US 2020/0203912 A1 Jun. 25, 2020

Related U.S. Application Data

(60) Provisional application No. 62/504,811, filed on May 11, 2017.

(51) Int. Cl.
*H01S 3/10* (2006.01)
*H01S 3/082* (2006.01)
(Continued)

(52) U.S. Cl.
CPC .......... *H01S 3/0823* (2013.01); *H01S 3/0815* (2013.01); *H01S 3/0826* (2013.01);
(Continued)

(58) Field of Classification Search
None
See application file for complete search history.

(56) References Cited

U.S. PATENT DOCUMENTS

| 3,443,243 A | 5/1969 | Patel | |
|---|---|---|---|
| 4,438,517 A * | 3/1984 | Bobb | H01S 3/105 372/107 |

(Continued)

FOREIGN PATENT DOCUMENTS

| JP | H07154021 A | 6/1995 |
|---|---|---|
| JP | 2002162513 A | 6/2002 |

OTHER PUBLICATIONS

International Search Report issued in Application No. PCT/US2018/031758, dated Jul. 23, 2018 (5 pages).
(Continued)

*Primary Examiner* — Tod T Van Roy
(74) *Attorney, Agent, or Firm* — Osha Bergman Watanabe & Burton LLP (57) ABSTRACT

An external optical feedback element (108) for tuning an output beam of a gas laser (102) having multiple wavelengths includes a partially reflective optical element (108) positioned on a beam path of the output beam (106) outside of an internal optical cavity of the gas laser (102), and a stage (114) to support the optical element and adjust rotation, horizontal tilt angle, and vertical tilt angle of the optical element with respect to the beam path. The output beam (106) is partially reflected at the optical element (108) and fed back into the internal optical cavity of the gas laser (102), with the intensity varying for multiple wavelengths
(Continued)

and adjusted by changing rotation, horizontal tilt angle and vertical tilt angle of the optical element. Thereby, a variable feedback of the output beam into the internal optical cavity of the gas laser is provided, which leads to a selective output wavelength of the gas laser, either at a single line or at multiple lines simultaneously. This setup may allow to control the wavelength of a commercial CO2 gas laser without a modification of the laser itself by adding a coupled cavity with a wavelength selective element like a grating to the given gas laser resonator.

11 Claims, 6 Drawing Sheets

(51) Int. Cl.
```
H01S 3/081    (2006.01)
H01S 3/105    (2006.01)
H01S 3/137    (2006.01)
H01S 3/223    (2006.01)
H01S 3/08     (2006.01)
```

(52) U.S. Cl.
CPC .......... *H01S 3/105* (2013.01); *H01S 3/10092* (2013.01); *H01S 3/137* (2013.01); *H01S 3/2232* (2013.01); *H01S 3/08063* (2013.01)

(56) References Cited

U.S. PATENT DOCUMENTS

| | | |
|---|---|---|
| 4,847,854 A | 7/1989 | Van Dijk |
| 5,046,184 A * | 9/1991 | Chee ..................... H01S 3/1112 372/18 |
| 2002/0063962 A1 | 5/2002 | Takada et al. |

OTHER PUBLICATIONS

Written Opinion issued in International Application No. PCT/US2018/031758, dated Jul. 23, 2018 (10 pages).

Gay et al.; "Improvement of the pulse and spectrum characteristics of a mode-locked argon laser with a phase-conjugating external cavity;" Optics Communications; XP 4091522; Apr. 15, 1997 (6 pages).

Mielke et al.; "Measurements of the phase shift on reflection for low-order infared Fabry-Perot interferometer dielectric stack mirrors;" Applied Optics; vol. 36; No. 31; Nov. 1997 (6 pages).

P. K. Gupta et al. "Various techniques for multiline operation of TEA CO2 lasers" Optics & Laser Technology, vol. 22, No. 6; May 14, 1990 (11 pages).

Office Action issued in Chinese Application No. 201880031125.7, dated May 8, 2021 (16 pages).

Office Action issued in Japanese Application No. 2019-561131, dated May 25, 2021 (10 pages).

* cited by examiner

EXTERNAL OPTICAL FEEDBACK ELEMENT FOR TUNING A MULTI-WAVELENGTH GAS LASER

FIELD OF INVENTION

The present invention relates generally to an external optical feedback element for adjusting the output wavelength of a gas laser.

BACKGROUND OF INVENTION

In a carbon dioxide ($CO_2$) gas laser, the closely-packed vibrational-rotational transitions within a $CO_2$ molecule enable emission wavelengths between 8.5 µm and 11.2 µm. Single wavelength operation as well as lasing at several bands simultaneously may be observed. The emission wavelength of an industrial $CO_2$ laser is typically centered either around 10.6 µm, 10.2 µm, 9.6 µm, or 9.3 µm (9.4 µm when isotopically labelled $^{18}O$ is used). Many industrial or medical applications require matching of the output wavelength of the $CO_2$ laser with absorption characteristics of the material of interest for optimal materials processing such as marking, cutting, or welding.

Existing technologies for tuning the output beam of a $CO_2$ laser, and therefore providing a multi-wavelength $CO_2$ laser, involve wavelength selective elements such as diffraction gratings, etalons, absorbing filters, birefringent tuners, and dielectric coatings. Common to these approaches is the insertion of an optical element in the internal optical cavity of the laser.

Other technologies rely on the use of several laser optical resonators that are combined through beam steering options.

SUMMARY OF INVENTION

In one aspect, one or more embodiments of the invention relate to an external optical feedback element for tuning an output beam of a gas laser having a plurality of wavelengths that includes a partially reflective optical element positioned on a beam path of the output beam outside of the internal optical cavity of the gas laser and a stage to support the optical element and adjust rotation, horizontal tilt angle, and vertical tilt angle of the element with respect to the beam path of the output beam. In the external optical feedback element, the output beam is partially reflected at the optical element and fed back into the internal optical cavity of the gas laser via the beam path. The intensity of the reflected beam varies for the plurality of wavelengths and is adjusted by changing rotation, horizontal tilt angle and vertical tilt angle of the optical element. Thereby a wavelength selected feedback into the internal optical cavity of the gas laser is provided, which sets the output wavelength of the gas laser.

In another aspect, one or more embodiments of the invention relate to a method of tuning an output beam of a gas laser having a plurality of wavelengths that includes reflecting the output beam of the gas laser at a partially reflective optical element, supported by a stage and positioned on a beam path of the output beam outside of the internal optical cavity of the gas laser, varying intensity of the reflected output beam for the plurality of wavelengths, adjusting the intensity of the reflected output beam for each of the plurality of wavelengths by adjusting changing rotation, horizontal tilt angle, vertical tilt angle of the optical element with respect to the beam path of the output beam, thereby selecting a wavelength at which the output beam is fed back into the internal optical cavity of the gas laser, feeding back the reflected output beam at the selected wavelength into the internal optical cavity of the gas laser, and enhancing the output beam of the gas laser at the selected wavelength.

Other aspects and advantages of the invention will be apparent from the following description and the appended claims.

BRIEF DESCRIPTION OF DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the claimed invention relate to an external optical feedback element for tuning the wavelength of an output beam from a multi-wavelength gas laser having a fixed internal optical cavity. For example, an external feedback element in accordance with one or more embodiments comprises a partially reflective optical element or mirror with a dielectric coating. Such an external element provides feedback into the laser cavity to selectively enhance a desired output beam wavelength, either at one output wavelength (single line) or at multiple wavelengths (multiple lines) simultaneously. The intensity of the feedback may be designed to vary for different wavelengths by the dielectric coating and may be adjusted by changing the position of the partially reflective optical element or mirror on a path of the output beam from the laser. The range of the output wavelength of a $CO_2$ laser may be tuned in the regular bands between 8.5 µm and 11.2 µm.

Further details of embodiments of the invention will be described below using an example of a $CO_2$ laser. This example is used for the purposes of illustrations only. Accordingly, the scope of the invention should not be considered limited to these specific applications.

Figure 1:
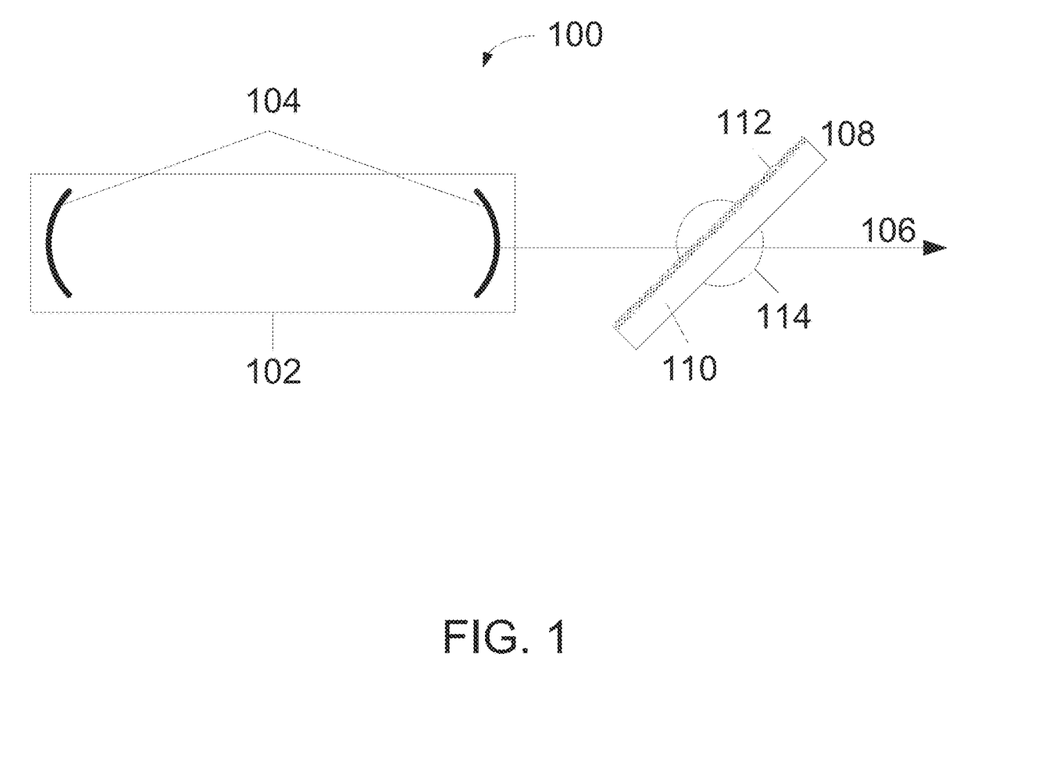
FIG. 1 shows a schematic view of a system in accordance with one or more embodiments of the invention.

FIG. 1 shows a schematic view of a system 100 in accordance with one or more embodiments of the invention. As shown, the system 100 includes a $CO_2$ laser 102 with an internal optical cavity 104, filled with an active laser medium including carbon dioxide. The $CO_2$ laser 102 emits a laser beam along a beam path 106. The optical element 108 comprises an optically flat or curved, partially transparent substrate 110 and a dielectric coating 112. The dielectric coating 112 may be on either side or both sides of the substrate 110. The optical element 108 may be positioned on the beam path 106 and may be supported by a manual or automated stage 114. The rotation, vertical tilt angle, and horizontal tilt angle of the optical element 108 may be adjusted by stage 114.

The light beam on the beam path 106 may be partially transmitted through the optical element 108 and partially reflected at the dielectric coating 112 on the optical element 108. The partially reflected light beam is fed into the internal optical cavity 104 of the laser 102 as a feedback via the beam path 106. The intensity of the reflected light beam at different wavelength may be dependent on properties of the dielectric coating. In one or more embodiments, the dielectric coating may have maximum transmission at 10.6 μm (e.g. >99.5%) and increase reflectivity with decreasing wavelength (e.g. down to 25% at 9.3 μm).

Further, the reflectivity of the dielectric coating at a wavelength may be varied by changing rotation, vertical tilt angle, and horizontal tilt angle of the optical element 108 with respect to the beam path 106. A vibrational-rotational transition within a $CO_2$ molecule corresponding to the wavelength of the feedback will be enhanced. Accordingly, rotating and/or tilting of the optical element 108 may select an output wavelength of the laser 102 to be enhanced and therefore tune the output beam of the laser 102.

Figures 2A, 2B, 2C:
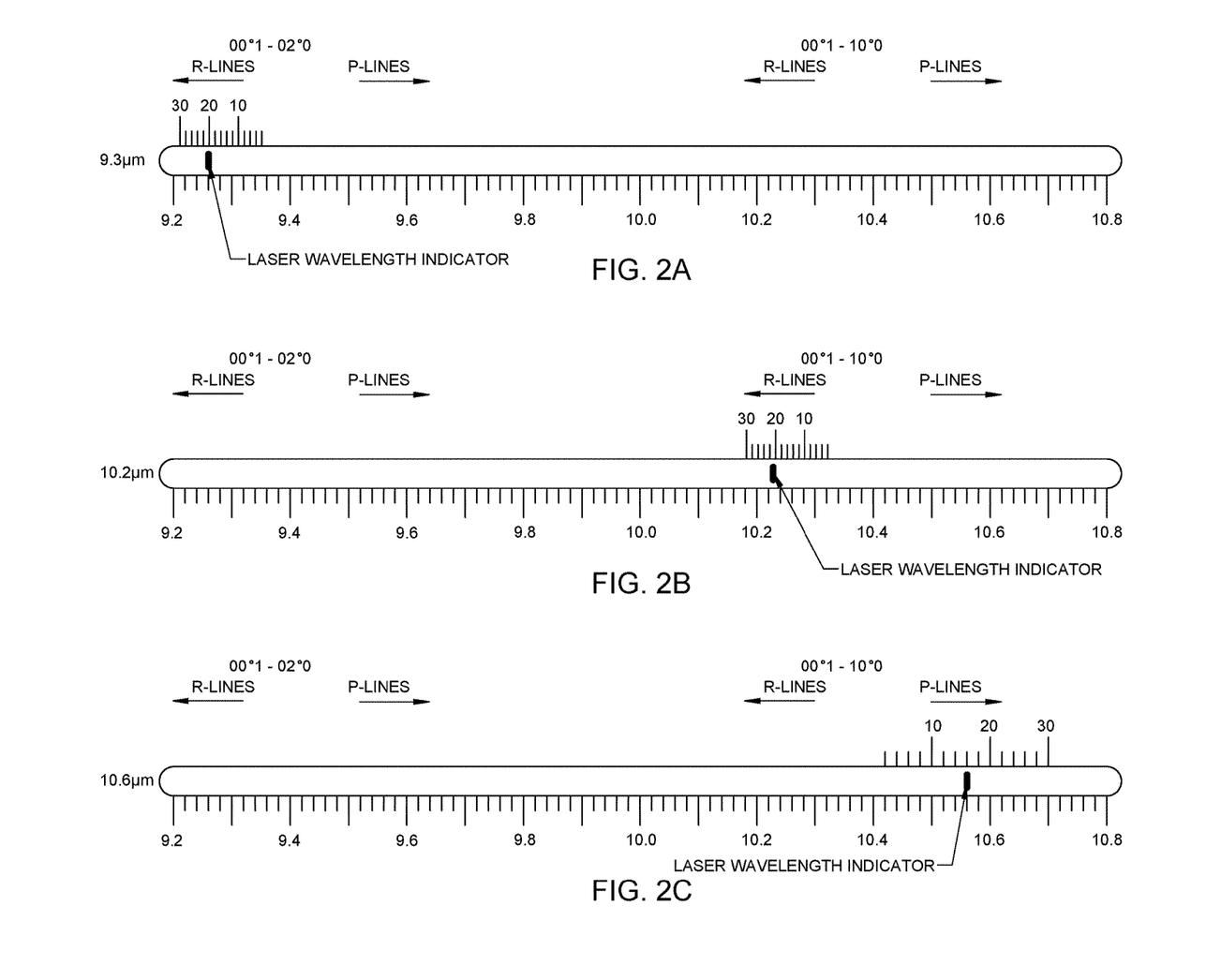
FIGS. 2A, 2B, and 2C show experimental data of output wavelengths recorded as a function of a rotation angle of the partially reflective optical element in accordance with one or more embodiments of the invention.

FIGS. 2A, 2B, and 2C show experimental data of output wavelengths of the system 100 recorded as a function of a rotation angle of the optical element 108. The laser 102 used was a 400 W pulsed $CO_2$ laser (e.g., the Pulstar series P400 laser produced by Synrad, Inc. without the beam conditioning unit). The rotation angle and orientation of the optical element 108 was changed manually through an optics mount. Images of a spectrometer reading are shown in FIG. 2. FIG. 2 shows that with changing the rotation angle of the optical element 108, the wavelength was reversibly tunable to be around 9.3 μm, 10.2 μm, or 10.6 μm. Those skilled in the art will appreciate that, given different materials and conditions of the laser involved, various other wavelengths may be obtained.

Figure 3:
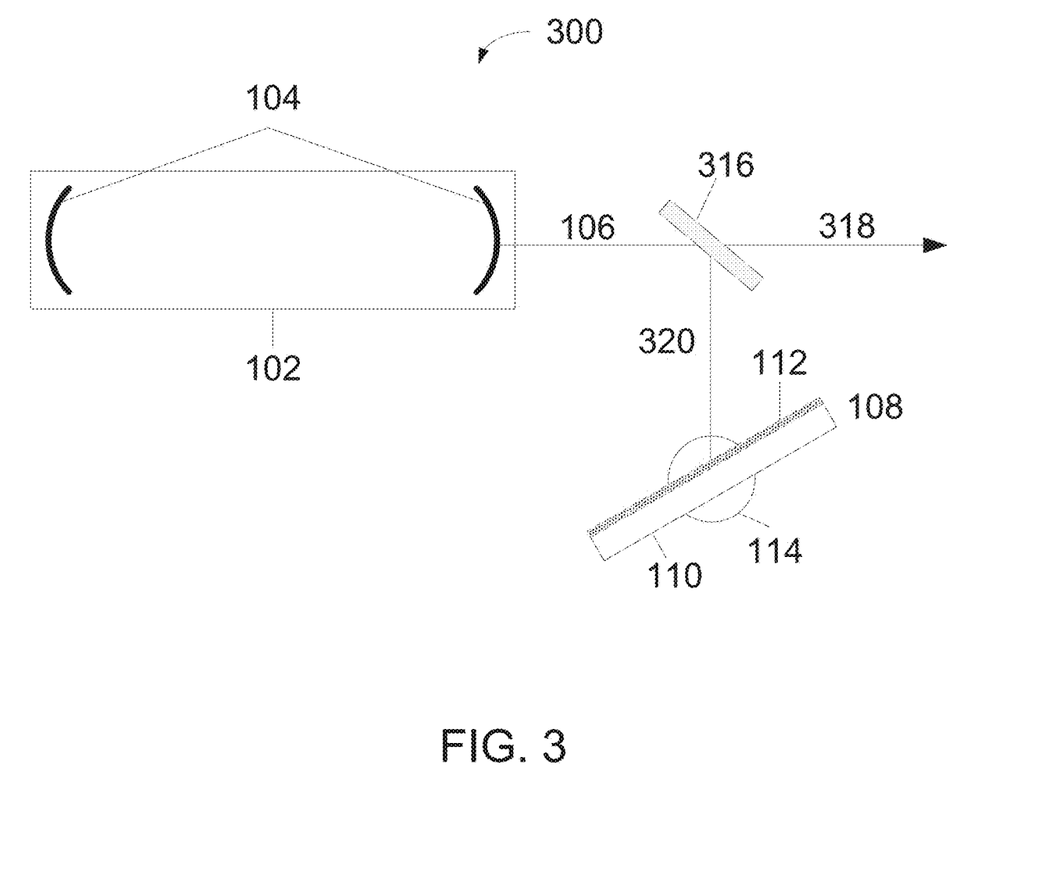
FIG. 3 shows a schematic view of a system in accordance with one or more embodiments of the invention.

FIG. 3 shows a schematic view of a system 300 in accordance with one or more embodiments of the invention. As shown, the system 300 includes a $CO_2$ laser 102 with an internal optical cavity 104, filled with an active laser medium including carbon dioxide. The $CO_2$ laser 102 emits a laser beam along a beam path 106. The light beam on the beam path 106 is split by a beam splitter 316 into a transmitted beam path 318 and a reflected beam path 320. An optical element 108 comprises an optically flat partially transparent substrate 110 and a dielectric coating 112. The optical element 108 may be positioned on the reflected beam path 320 and supported by a manual or automated stage 114. The rotation, vertical tilt angle, and horizontal tilt angle of the optical element 108 may be adjusted by the stage 114. Light beam reflected at the optical element 108 is fed into the internal optical cavity 104 of the laser 102 as a feedback via the reflected beam path 320, the beam splitter 316, and the beam path 106. The intensity of the reflected light beam at different wavelength may be dependent on properties of the dielectric coating.

Further, the reflectivity of the dielectric coating at a wavelength may be varied by changing rotation, vertical tilt angle, and horizontal tilt angle of the optical element 108 with respect to the reflected beam path 320. A vibrational-rotational transition or band within a $CO_2$ molecule corresponding to the wavelength of the feedback will be enhanced. Accordingly, rotating and/or tilting of the optical element 108 may select an output wavelength of the laser 102 to be enhanced and, therefore, tune the output wavelength of the laser 102.

Figure 4:
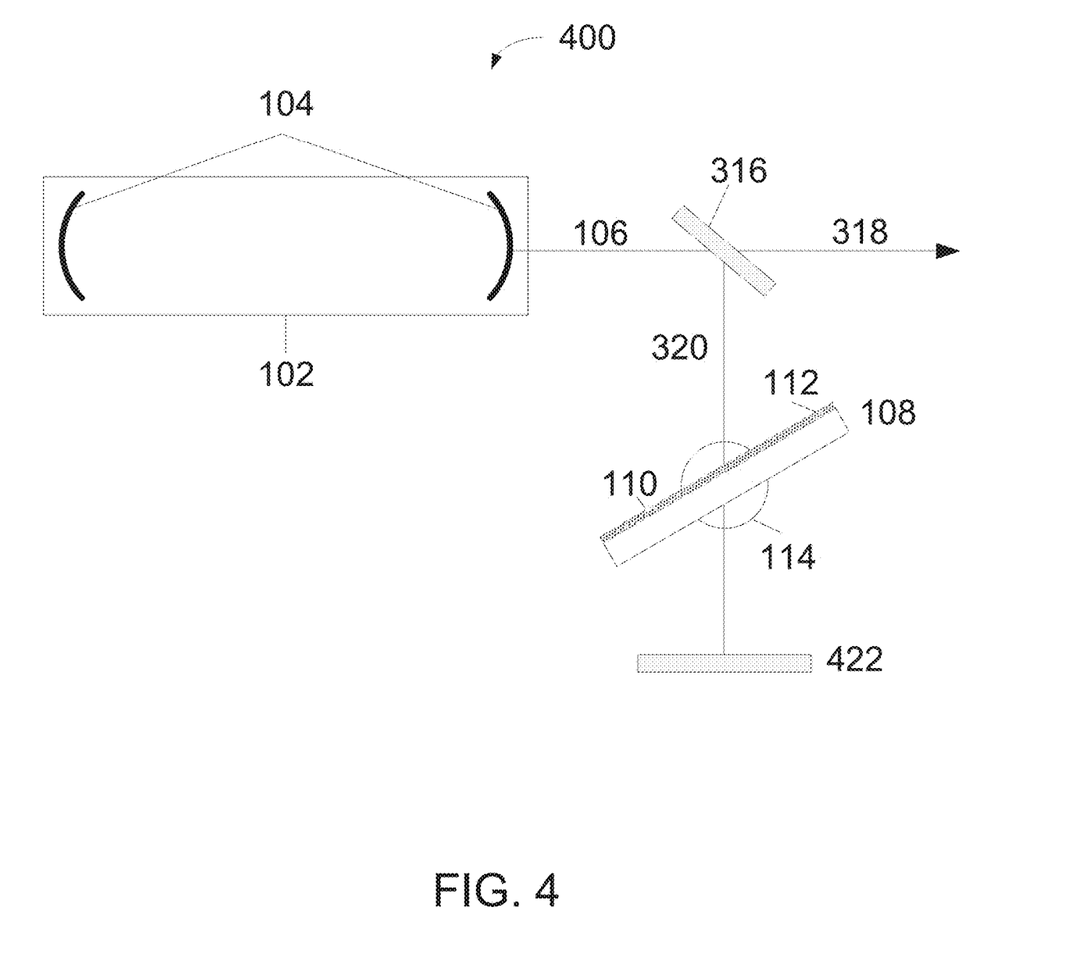
FIG. 4 shows a schematic view of a system in accordance with one or more embodiments of the invention.

FIG. 4 shows a schematic view of a system 400 in accordance with one or more embodiments of the invention. As shown, the system 100 includes a $CO_2$ laser 102 with an internal optical cavity 104, filled with an active laser medium including carbon dioxide. The $CO_2$ laser 102 emits a laser beam along a beam path 106. The light beam on the beam path 106 is split by a beam splitter 316 into a transmitted beam path 318 and a reflected beam path 320. An optical element 108 comprises an optically flat partially transparent substrate 110 and a dielectric coating 112. The optical element 108 may be positioned on the reflected beam path 320 and supported by a manual or automated stage 114. The rotation, vertical tilt angle, and horizontal tilt angle of the optical element 108 may be adjusted by the stage 114. Light beam reflected at the optical element 108 is fed into the internal optical cavity 104 of the laser 102 as a feedback via the reflected beam path 320, the beam splitter 316, and the beam path 106. The portion of the light beam on the reflected beam path 320 transmitted through the optical element 108 is reflected at a mirror 422 back in the reflected beam path 320.

Further, the reflectivity of the dielectric coating at a wavelength may be varied by changing rotation, vertical tilt angle, and horizontal tilt angle of the optical element 108 with respect to the reflected beam path 320. A vibrational-rotational transition within a $CO_2$ molecule corresponding to the wavelength of the feedback will be enhanced. Accordingly, rotating and/or tilting of the optical element 108 may select an output wavelength of the laser 102 to be enhanced and therefore tune the output beam of the laser 102.

Figure 5:
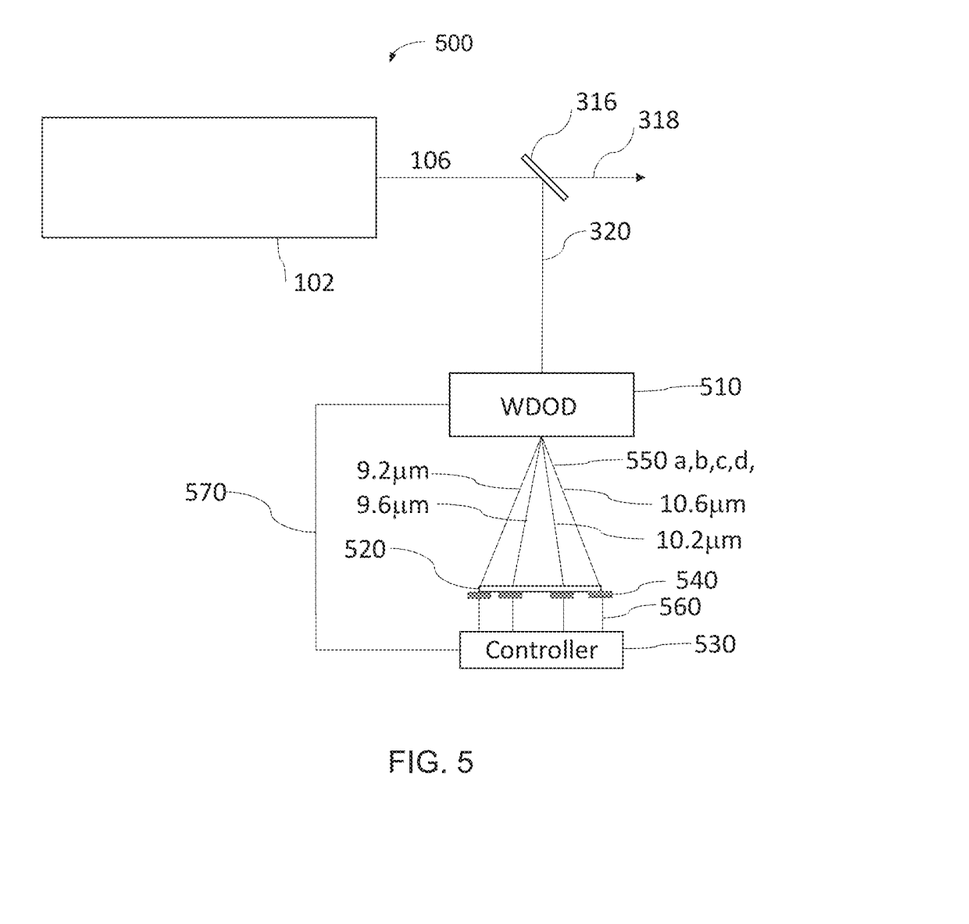
FIG. 5 shows system in in accordance with one or more embodiments of the invention.

FIG. 5 shows system 500 with a further embodiment whereby the output wavelength of the device may be stabilized and the wavelengths may be adjusted on a rapid time scale. As shown, the system 500 includes a $CO_2$ laser 102 with an internal optical cavity 104, filled with an active laser medium including carbon dioxide. The $CO_2$ laser 102 emits a laser beam along a beam path 106. The light beam on the beam path 106 is split by a beam splitter 316 into a transmitted beam path 318 and a reflected beam path 320. The reflected beam 320 is passed through a Wavelength Dependent Optical Device (WDOD) 510 which transmits the beam 550a to 550d at different angles depending on the wavelength. The WDOD may be an active or passive device, e.g., Acousto-Optics modulator or an Electro-Optic Modulator or a diffractive optic element such as a grating.

550 a would be a laser beam with wavelengths corresponding to the 9.2 μm band, 550 b would be a laser beam with wavelengths corresponding to the 9.6 μm band, 550 c would be a laser beam with wavelengths corresponding to the 10.2 μm band and 550 d would be a laser beam with wavelengths corresponding to the 10.6 μm band. The wavelength bands would vary if isotopic mixtures of the $CO_2$ laser gas were used for example the C12O18, C13O16, C13O16, C14O16, C14O18 etc. The beams 550 a-d would pass through to a flat or curved partially reflecting optical element 520 and part of the beam would retro-reflect back along 320 and reflect off beam splitter 316 back into the laser, the other part of this beam that transmits through optical element 520 will impinge on one of the four detectors 540. Those skilled in the art will appreciate that, depending on the exact configuration employed, the beams transmitted through the optical element 520 may impinge on more or less than one of the four detectors 540.

The signal from these detectors 540 is transmitted via 560 to a controller 530. The controller 530 then transits the signal back to WDOD 510 via a feedback loop 570. The controller 530, in conjunction with the detectors 540, the WDOD 510, and the feedback loop 570, allow control of both the wavelength and, if required, the power, in each wavelength that results from the laser system. These wavelengths will be adjustable on much shorter timeframes than normally possible, e.g., ~1-5 microseconds.

While FIGS. 1, 3, 4, and 5 show specific configurations or layouts in accordance with one or more embodiments, other configurations or layouts may be employed without departing from the scope of the invention.

Figure 6:
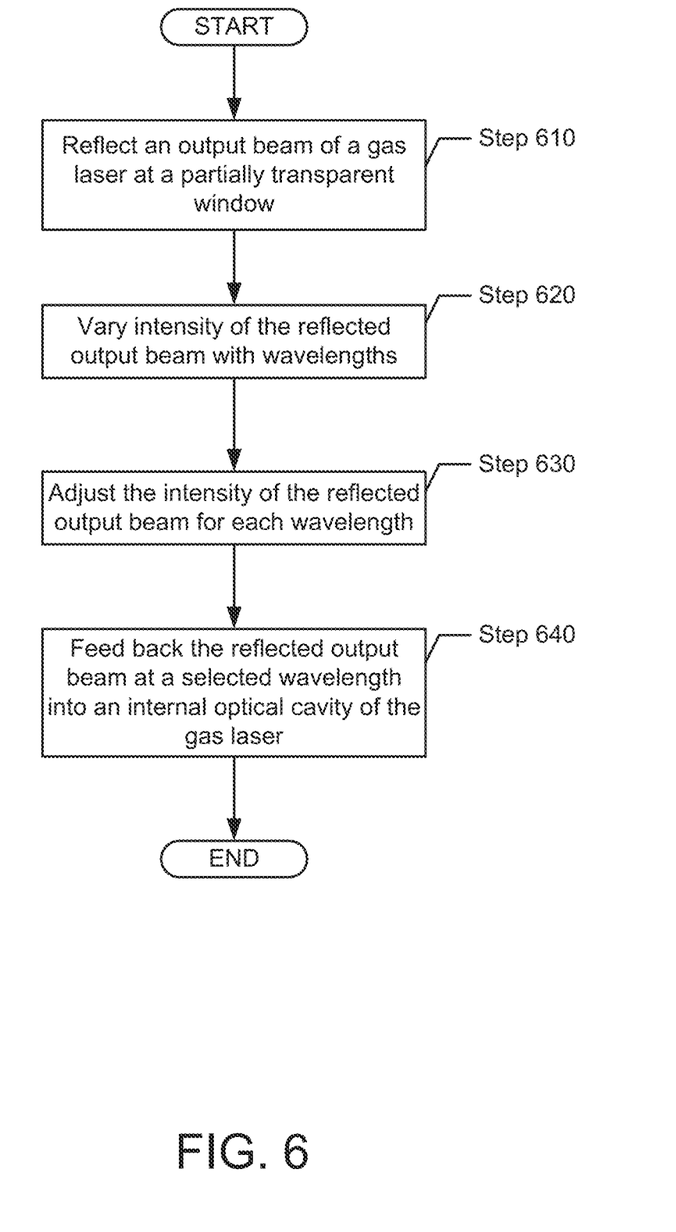
FIG. 6 shows a flowchart in accordance with one or more embodiments of the invention.

FIG. 6 shows a flowchart in accordance with one or more embodiments of the invention. Those skilled in the art, having the benefit of this detailed description, would appreciate that the steps may be implemented by other components without departing from the scope of the invention. In one or more embodiments of the invention, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Initially, in Step 610, an output beam of a gas laser is reflected at a partially reflecting optical element, supported by a stage and positioned on a beam path of the output beam outside of an internal optical cavity of the gas. The optical element may comprise a dielectric coating that provides reflectivity varying with wavelengths. The stage may adjust rotation, horizontal tilt angle, and vertical tilt angle of the optical element with respect to the beam path of the output beam.

The beam path of the output beam may be split into a transmitted beam path and a reflected beam path. The optical element and the stage may be positioned on the reflected beam path. Further, a portion of the output beam transmitted through the optical element may be reflected at a mirror back on the reflected beam path.

In Step 620, intensity of the reflected output beam at the optical element is varied for different wavelengths.

In Step 630, the intensity of the reflected output beam for each of the plurality of wavelengths is adjusted by changing rotation, horizontal tilt angle, and vertical tilt angle of the optical element with respect to the beam path of the output beam. Accordingly, a wavelength is selected at which the output beam is fed back into the internal optical cavity of the gas laser.

In Step 640, the reflected output beam at the selected wavelength is fed back into the internal optical cavity of the gas laser. Accordingly, the output beam of the gas laser at the selected wavelength is enhanced.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. An external optical feedback element for tuning an output beam of a gas laser having a plurality of wavelengths, comprising:
   a partially reflecting optical element positioned on a beam path of the output beam outside of an internal optical cavity of the gas laser; and
   a stage to support the optical element and adjust a rotation, a horizontal tilt angle, and a vertical tilt angle of the optical element with respect to the beam path of the output beam;
   wherein the output beam is partially reflected at the optical element and fed back into the internal optical cavity of the gas laser via the beam path,
   the intensity of the reflected beam varies for the plurality of wavelengths,
   the intensity of the reflected beam for each of the plurality of wavelengths is adjusted by changing the rotation, the horizontal tilt angle, and the vertical tilt angle of the optical element,
   thereby a wavelength is selected at which the output beam is fed back into the internal optical cavity of the gas laser enhancing the output beam of the gas laser at the selected wavelength, wherein the partially reflective optical element has a transparent substrate and a dielectric coating which gives a reflectivity which varies according to the wavelength, and the reflectivity being in the range between 0.5% and 75% at a wavelength between 10.6 μm and 9.3 μm.

2. The external optical feedback element of claim 1, wherein
   the gas laser is a carbon dioxide laser, and
   the plurality of wavelengths of the output beam of the gas laser is between 8.5 μm and 11.2 μM.

3. The external optical feedback element of claim 1, further comprising:
   a beam splitter that splits the output beam of the gas laser into a transmitted beam path and a reflected beam path,
   wherein the optical element, supported by the stage, is positioned on the reflected beam path,
   the stage adjusts rotation, horizontal tilt angle, and vertical tilt angle of the optical element with respect to the reflected beam path, and
   the output beam is partially reflected at the optical element and fed into the internal optical cavity of the gas laser via the reflected beam path, the beam splitter, and the beam path.

4. The external optical feedback element of claim 3, further comprising:
   a mirror on the reflected beam path, wherein a portion of the output beam transmitted through the optical element reflects back on the reflected beam path.

5. A method of tuning an output beam of a gas laser having a plurality of wavelengths, comprising:
   a partially reflective optical element that is supported by a stage and positioned on a beam path of the output beam outside of an internal optical cavity of the gas laser;
   varying intensity of the reflected output beam for the plurality of wavelengths;
   adjusting the intensity of the reflected output beam for each of the plurality of wavelengths by adjusting a rotation, a horizontal tilt angle, and a vertical tilt angle of the optical element with respect to the beam path of the output beam, thereby selecting a wavelength at which the output beam is fed back into the internal optical cavity of the gas laser, wherein the partially reflective optical element has a transparent substrate and a dielectric coating which gives a reflectivity which varies according to the wavelength, and the reflectivity being in the range between 0.5% and 75% at a wavelength between 10.6 µm and 9.3 µm;

feeding back the reflected output beam at the selected wavelength into the internal optical cavity of the gas laser; and enhancing the output beam of the gas laser at the selected wavelength.

6. The method of claim 5, wherein the stage adjusts the rotation, the horizontal tilt angle, and the vertical tilt angle of the optical element with respect to the beam path of the output beam.

7. The method of claim 5, further comprising:

splitting the output beam of the gas laser by a beam splitter into a transmitted beam path and a reflected beam path, wherein the optical element, supported by the stage, is positioned on the reflected beam path.

8. The method of claim 6, further comprising:

reflecting a portion of the output beam transmitted through the optical element at a mirror back on the reflected beam path.

9. An external optical feedback element for tuning an output beam of a gas laser having a plurality of wavelengths, comprising:

a first partially reflecting optical element positioned on a beam path of the output beam outside of an internal optical cavity of the gas laser; and wavelength dependent optical element (WDOE); and a second partially reflecting optical element positioned in the beam path; and a series of detectors, each spaced to accept specific wavelength bands; and a controller connected to the WDOE and the series of detectors, wherein the output beam is partially reflected at the first partially reflecting optical element and fed through the WDOE to the second partially reflecting optical element which retro-reflects a portion of the beam back to the laser and transmits a portion of the beam to the series of detectors, the controller adjusts the WDOE such that the beam reflected back to the laser has a wavelength that can be stabilized and controlled such that the laser can operate at any of the specific wavelength bands.

10. The external optical feedback element of claim 9, wherein the specific wavelength bands are between 8.5 µm and 11.2 µm.

11. The external optical feedback element of claim 9, wherein the specific wavelength bands are selected from the group consisting of: 9.3 µm, 9.6 µm, 10.2 µm, and 10.6 µm.

* * * * *